United States Patent [19]

Yanagimoto et al.

[11] 4,180,496

[45] Dec. 25, 1979

[54] MELAMINE CYANURATE AS A FLAME RETARDANT AGENT

[75] Inventors: Akira Yanagimoto, Tokyo; Shunichi Kumazawa, Ichihara; Yasuo Takakuwa, Fuchumachi, all of Japan

[73] Assignee: Nissan Chemical Industries Ltd., Tokyo, Japan

[21] Appl. No.: 866,379

[22] Filed: Jan. 3, 1978

[30] Foreign Application Priority Data

Jan. 17, 1977 [JP] Japan .................................. 52-3828

[51] Int. Cl.$^2$ .............................................. C08K 5/34
[52] U.S. Cl. .......................... 260/45.8 NT; 260/40 R; 260/45.7 R; 260/45.75 B
[58] Field of Search ............... 260/45.8 NT, 40 R; 526/6

[56] References Cited

U.S. PATENT DOCUMENTS

| | | | |
|---|---|---|---|
| 3,681,281 | 8/1972 | Juelke et al. | 260/45.8 NT |
| 3,950,306 | 4/1976 | Pews et al. | 260/45.8 NT |
| 3,959,219 | 5/1976 | Aoyama et al. | 260/45.8 NT |
| 3,980,616 | 9/1976 | Kimura et al. | 260/45.8 NT |
| 4,001,177 | 1/1977 | Tsutsumi et al. | 260/45.8 NT |
| 4,061,605 | 12/1977 | Simon | 260/45.8 NT |
| 4,085,283 | 4/1978 | Den Otter et al. | 260/45.8 NT |
| 4,122,269 | 10/1978 | Chono et al. | 260/45.8 NT |

*Primary Examiner*—Howard E. Schain
*Assistant Examiner*—R. A. White
*Attorney, Agent, or Firm*—Oblon, Fisher, Spivak, McClelland & Maier

[57] ABSTRACT

A flameproof resin composition comprising the admixture of 3 to 30 wt. % of an adduct of 2,4,6-triamino-1,3,5-triazine and 2,4,6-trihydroxy-1,3,5-triazine and/or a tautomer thereof with a linear polyester.

7 Claims, No Drawings

MELAMINE CYANURATE AS A FLAME RETARDANT AGENT

BACKGROUND OF THE INVENTION

1. Field of the Invention

The present invention relates to a flameproof resin composition having thermal stability.

2. Description of the Prior Art

Polyamides and polyesters have excellent characteristics of fabricatability, mechanical property, electric property and heat resistance and they have been used as shaped articles, fibers and films, which are widely used in the industries. From the viewpoint of safety against the firing of plastics, the requirement of flameproof has been seriously considered and the reduction of flammability of the resin has been required in some usages.

Heretofore, the method of imparting flameproofing characteristic to polyamides by adding melamine or cyanuric acid type compound have been proposed (Japanese Patent Publication Nos. 19941/1967; 1714/1972 and Japanese Unexamined Patent Publication Nos. 96640/1975 and 105744/1975).

The temperature for fabricating polyamides or polyesters are usually high such as 200° to 300° C. The flameproofing agents of melamine or cyanuric acid type compound are easily decomposed at the fabrication to be disadvantageous in the practical operation.

The disadvantages are caused by the following reasons.

(1) Melamine initiates to sublimate at higher than 220° C. whereby bubbles are incorporated in the product and the mechanical characteristics are deteriorated.

(2) Cyanuric acid is easily decomposed by the thermal decomposition whereby the fabrication at higher than 250° C. is difficult.

(3) The miscibility of melamine or cyanuric acid to resins is not good whereby it is necessary to pulverize the resins to be less than 50λ of a diameter.

(4) The hydrophilic property of melamine or cyanuric acid is high, whereby it is necessary to dry it before fabrication and to take care of moisture at the fabrication.

SUMMARY OF THE INVENTION

It is an object of the present invention to provide a flameproof resin composition which has high flameproof property without incorporating bubbles and any coloring.

It is the other object of the present invention to provide a flameproof polyester resin composition which has high mechanical strength and which can be easily prepared without pulverizing the flameproofing agent.

The foregoing and other objects of the present invention have been attained by incorporating 3 to 30 wt. % of an adduct of 2,4,6-triamino-1,3,5-triazine and 2,4,6-trihydroxy-1,3,5 triazine and/or a tautomer thereof (a molar ratio of about 1:1) into a polyester.

DETAILED DESCRIPTION OF PREFERABLE EMBODIMENTS

The adduct used in the present invention is prepared by mixing an aqueous solution of melamine with an aqueous solution of cyanuric acid (I) or a tautomerism of cyanuric acid (II) at a molar ratio of substantially equi-mole to

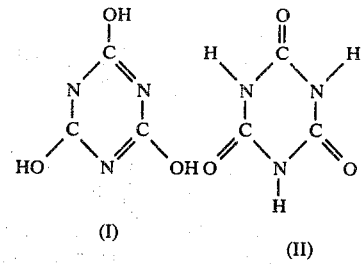

precipitate it as water-insoluble fine crystals. The adduct is an adduct of melamine and cyanuric acid at a molar ratio of 1:1. The formation of the adduct was applied for the analysis of melamine by Nebbia, Guerrieri and Pagani in Giormole di Chimica Industrial. Ed. Applicata, P 81 (1957).

The structure of the adduct is not clear but it is considered that cyanuric acid formes the keto-form and the addition coupling of amino group of melamine with the keto-form

is formed. The heat loss initiating temperature of the adduct is remarkably high because of the stabilization in complex form.

Accordingly, the thermal stability of the adduct in the fabrication is remarkably improved in comparison with melamine or cyanuric acid whereby the bubbles and the coloring of the resin are reduced and the fabrication temperature can be increased.

The adduct of 2,4,6-triamino-1,3,5-triazine and 2,4,6-trihydroxy-1,3,5-triazine and/or a tautomerism can be obtained as fine crystals having a diameter of less than 10μ and it is not necessary to pulverize the adduct. The adduct can be dispersed into the resin in high degree. Incidentally the active hydrogen atoms of the adduct can be substituted with a substituent as far as the complex stability of the adduct is maintained.

Suitable resins used for the flameproof resin composition include polyesters such as polyethylene-terephthalate and polybutylene terephthalate. The other resins which can be fabricated at lower than 300° C. can be also used as the resin component.

The ratio of the adduct to the resin is dependent upon the desired flameproof degree and the kind of the resin and it is usually in a renge of 3 to 30 wt. % preferably 5 to 20 wt. %.

When the ratio of the adduct to the resin is lower, the flameproof effect is not enough except adding the other flameproofing agent. On the other hand, when the ratio of the adduct to the resin is higher, the mechanical strength of the resin is too low and the characteristics of the resin are lost disadvantageously.

It is possible to add the other flameproofing agent such as antimony oxide and halogen-containing compounds; and a fibrous filler such as glass fiber carbon fiber and asbestos fiber and a filler such as talc and carbon and the other additive such as dyes, pigments, lubricants, antielectrostatic agents, weather stabilizers and plasticizers.

The flameproof effect has been measured by the following test method in the examples.

(1). Flameproof property

The flameproof property was measured by the method of Subject 94 (UL-94 test method) (Underwriters' Laboratories, INC. in U.S.A.).

A test piece having a length of 5", a width of ½" and a thickness of ⅛" was prepared and was held in the vertical direction by a clump. A flame of a burner was contacted with the lower edge of the test piece for 10 seconds and the flame was taken out and the time required for quenching was measured. After the quenching, the flame was contacted again and taken out and the time required for quenching was measured.

A cotton pellet was placed below the lower edge of the test piece 12 inches and the combustion of the cotton pellet caused by the melt-dropped material was observed. The flame contact test was repeated for 5 test pieces. When a total flaming time for 5 test pieces was less than 50 seconds and the cotton pellet was not fired, it was rated as V-0 (highest flameproof degree in the method of VL-94). When a flaming time for one test piece was less than 50 seconds and a total flaming time for 5 test pieces was less than 250 seconds and the cotton pellet was not fired, it was rated as V-1. When the cotton pellet was fired, it was rated as V-2. The rates of V-0, V-1 and V-2 are self-quenching and the flameproof degrees are rated.

(2). Limiting Oxygen Indes (L.O.I) method

The limiting oxygen index (L.O.I) was measured by the method of Japanese Industrial Standard K-7201-72 using Suga ON-1 type combustion tester. (manufactured by Suga Tester K.K.). In some tests, the test piece of polyamide or polyester was held at a slant angle of 45 degree from the vertical direction so as to prevent the quenching caused by the melt-drop of the resin.

(3). Mechanical properties

The tensile strength was measured by the method of ASTM-D-638.

The Izod impact strength was measured by the method of ASTM-D-256 (notch).

(4). The hue of molded test pieces

The hue of the test piece was measured by the method of ASTM-D-2244 with a disc sample having a diameter of 100 mm and a thickness of 3 mm molded at the same time by a HUNTER color-difference meter (AU-CH-1 type manufactured by a Suga Testing Machine K.K.) when L value is higher and the absolute aL-value and bL-value are lower, the whiteness is higher.

Example 1

In a vessel, 50 g of cyanuric acid was dissolved in 2 liters of water at 80° to 90° C. In the other vessel, 50 g of melamine was dissolved in 3 liters of water at 80° to 90° C. Both of the solutions were poured into a vessel under the condition of maintaining excess of cyanuric acid with stirring whereby white crystals of an adduct of 2,4,6-triamino-1,3,5-triazine and 2,4,6-trihydroxy-1,3,5-triazine were precipitated.

The slurry was filtered and washed with water and then, with methanol and dried at 50° C. under a reduced pressure of about 1 mmHg for 24 hours to obtain the white powder of the adduct having an average diameter of 2 to 5µ.

Examples 2 to 4 and References 1 to 3

Nylon-6 was pulverized and dried at 130° C. under a reduced pressure of about 1 mmHg for 10 hours. The power of the adduct of 2,4,6-triamino-1,3,5-triazine and 2,4,6-trihydroxy-1,3,5-triazine obtained in Example 1 was added to the dried nylon-6 at the ratios shown in Table 1.

The mixtures were respectively blended in a ball mill and dried in the same conditions under the reduced pressure and pressed at 230° C. by a press method to prepare the samples.

The flameproof tests of the UL-94 and L.O.I. were carried out.

As the references, melamine or cyanuric acid was added to the dried nylon-6 and the test pieces were prepared and the flameproof tests were carried out in the same conditions.

Example 5 and References 4 to 6

In accordance with the process of Example 2 except using nylon-12 instead of nylon-6 and pressing them at 200° C., test pieces were prepared and the flameproof effects of the adduct, melamine and cyanuric acid were compared. The results are shown in Table 2. When the adduct of 2,4,6-triamino-1,3,5-triazine and 2,4,6-trihydroxy-1,3,5-triazine was incorporated, the coloring was not caused in the fabrication and the flameproof effect was high.

Examples 6 and 7 and References 7 to 9

In accordance with the process of Example 2 except using polybutyleneterephthalate ($[\eta]=1.10$ dl/g at 30° C. in a mixed solvent of phenol and 1,1,2,2-tetrachloroethane at a weight ratio of 3:2) instead of nylon-6, and pressing them at 250° C., test pieces were prepared, and the flameproof effects of the adduct, melamine and cyanuric acid were compared. The results are shown in Table 3. When the adduct of 2,4,6-triamino-1,3,5-triazine and 2,4,6-trihydroxy-1,3,5-triazine was incorporated, the coloring was especially less in the fabrication and the flameproof effect was high.

Table 1

| Test No. | Exp. 2 | Exp. 3 | Exp. 4 | Ref. 1 | Ref. 2 | Ref. 3 |
|---|---|---|---|---|---|---|
| Resin | nylon-6 | " | " | " | " | " |
| Flameproofing agent type | Adduct | " | " | none | ME | CA |
| Amount (wt. %) | 5 | 10 | 20 | 0 | 20 | 20 |
| Hue | none | " | " | " | brown | " |
| Appearance | no bubbling | " | " | " | " | bubbling |
| L.O.I. % | 27.8*1 | 29.3*1 | 29.5*1 | 23.2 | 28.8*1 | none*3 |
| Flameproof property UL-94 flaming time *2(sec.) | 16.3 | 10.8 | 14.2 | >250 | 14.5 | none*3 |
| Rate | V-2 | " | V-0 | HB | V-0 | V-0 | note:
*1: The test piece was held at a slant angle of 45 degree in the test of L.O.I.
*2: Total flaming times for 5 pieces.
Adduct: adduct of 2,4,6-triamino-1,3,5-triazine and 2,4,6-trihydroxy-1,3,5-triazine
ME: melamine
CA: cyanuric acid
*3: It could not be measured Table 2

| Test No. | Exp. 5 | Ref. 4 | Ref. 5 | Ref. 6 |
|---|---|---|---|---|
| Resin | nylon-12 | " | " | " |
| Flameproofing agent type | Adduct | none | ME | CA |
| Amount (wt. %) | 20 | 0 | 20 | 20 |
| Hue | none | " | brown | " |
| Appearance | no bubbling | " | " | " |
| L.O.I. % | 28.8*[1] | 22.7 | 26.8*[1] | 28.3*[1] |
| Flameproof property UL-94 | | | | |
| flaming time *[2](sec.) | 39.3 | >250 | 22.9 | — |
| Rate | V-0 | HB | V-0 | — |

Table 3

| Test No. | Exp. 6 | Exp. 7 | Ref. 7 | Ref. 8 | Ref. 9 |
|---|---|---|---|---|---|
| Resin | poly-butylene-tere-phthalate | " | " | " | " |
| Flameproofing agent type | Adduct | " | none | ME | CA |
| Amount (wt. %) | 20 | 30 | 0 | 20 | 20 |
| Hue | none | no | " | " | brown |
| Appearance | bubbling | " | " | " | bubbling |
| L.O.I. % | 24.5 | 25.5 | 19.0 | 27.4*[1] | — |

Examples 8 to 10

Nylon-6 was pulverized and zinc stearate was added at a ratio of 0.05 PHR and a powder of the adduct of 2,4,6-triamino-1,3,5-triazine and 2,4,6-trihydroxy-1,3,5-triazine was added at the ratio shown in Table 4. The mixture was blended in a tumbler and dried at 80° C. for longer than 24 hours under passing air. The mixture was molded at 250° C. by an injection molding machine having a diameter of 36 mmφ, an injection capacity of 5 ounces (IS-90B manufactured by Toshiba K.K.) to prepare test pieces. The continuous molding for 50 shots was carried out. Both the surface of a mold and the products were not stained and the dispersibility of the adduct in the resin was remarkably high.

The test results are shown in Table 4.

Reference 10

Nylon-6 was not pulverized and it was dried at 80° C. for longer than 24 hours and it was molded by an injection molding to prepare various test pieces. The test results are shown in Table 4.

Reference 11

In accordance with the process of Example 8 except adding 20 wt. % of a fine powder of melamine instead of the adduct, the test pieces were prepared.

The test results are shown in Table 4.

The condition in the molding was similar to that of the addition of the adduct. However, the hue of the test piece was pale brown to be inferior to that of the addition of the adduct.

Reference 12

In accordance with the process of Example 8 except adding 20 wt. % of a fine powder of cyanuric acid instead of the adduct, the test pieces were prepared at the same temperature.

The bubbling caused by decomposing the cyanuric acid was severe to be quite difficult to mold it. Accordingly, the mixture was molded at 240° C. The test results are shown in Table 4. The hue of the test piece was brown.

Reference 13

A fine powder of melamine and a fine powder of cyanuric acid were blended at a ratio of 1:1 by weight and the mixture was added to nylon-6 at a ratio of 20 wt. %.

The mixture was molded by the process of Example 8. The bubbling was severe and even though the molding temperature was lowered, suitable test piece could not be obtained in the injection moldable condition.

Example 11

Nylon-6,6 was pulverized and zinc stearate was added at a ratio of 0.05 PHR and then, 20 wt. % of a fine powder of the adduct of 2,4,6-triamino-1,3,5-triazine and 2,4,6-trihydroxy-1,3,5-triazine was added. The mixture was dried and molded at 270° C. by an injection molding to prepare test pieces. The dispersibility of the adduct in the test piece was remarkably high and no coloring was found. The test results of the mechanical strength and the flameproof property are shown in Table 4.

Reference 14

Nylon-6,6 was not pulverized and dried at 80° C. for longer than 24 hours and molded at 270° C. by an injection molding to prepare test pieces.

The results are shown in Table 4.

Reference 15

In accordance with the process of Example 11 except adding 20 wt. % of a fine powder of melamine instead of the adduct, the test pieces were prepared. The product was colored and have inferior properties.

The test results are shown in Table 4.

Reference 16

In accordance with the process of Example 8 except adding 20 wt. % of a fine powder of cyanuric acid instead of the adduct, the test pieces were prepared at the same temperature.

The bubbling caused by decomposing the cyanuric acid was severe. Even though the molding temperature was lowered, suitable test piece could not be obtained in the injection moldable condition.

Reference 17

A fine powder of melamine and a fine powder of cyanuric acid were blended at a ratio of 1:1 by weight and the mixture was added to nylon-6,6, at a ratio of 20 wt. %.

The mixture was molded by the process of Example 11. The bubbling was severe and the nozzle of the injection molding machine was clogged to be difficult to mold it.

Table 4

| Test No. | Exp. 8 | Exp. 9 | Exp. 10 | Ref. 10 | Ref. 11 | Ref. 12 | Exp. 11 | Ref. 14 | Ref. 15 |
|---|---|---|---|---|---|---|---|---|---|
| Resin | nylon-6 | " | " | " | " | " | nylon-6,6 | " | " |
| Flameproofing agent | | | | | | | | | |

Table 4-continued

| Test No. | Exp. 8 | Exp. 9 | Exp. 10 | Ref. 10 | Ref. 11 | Ref. 12 | Exp. 11 | Ref. 14 | Ref. 15 |
|---|---|---|---|---|---|---|---|---|---|
| Type: | Adduct | " | " | — | ME | CA | Adduct | — | ME |
| Amount: | 5 | 10 | 20 | — | 20 | 20 | 20 | — | 20 |
| Mechanical strength | | | | | | | | | |
| Tensile strength (kg/cm$^2$) | 811 | 748 | 620 | 817 | 657 | 742 | 716 | 852 | 720 |
| Izod impact strength (kg cm/cm) | 5.5 | 4.4 | 3.5 | 5.3 | 4.0 | 3.2 | 3.2 | 4.0 | 3.2 |
| Hue | | | | | | | | | |
| L | 91.0 | 92.0 | 93.2 | — | 89.0 | 86.6 | 93.7 | — | 87.9 |
| aL | −0.99 | −0.68 | −0.38 | — | −1.68 | −0.21 | −0.40 | — | −1.75 |
| bL | 4.63 | 4.41 | 4.14 | — | 5.31 | 6.78 | 2.84 | — | 7.12 |
| Flameproof property | | | | | | | | | |
| UL-94 test | V-2 | V-2 | V-0 | HB | V-0 | V-0 | V-0 | V-2 | V-0 | note:
Adduct: adduct of 2,4,6-triamino-1,3,5-triazine and 2,4,6-trihydroxy-1,3,5-triazine
ME: melamine
CA: cyanuric acid

What is claimed is:

1. A flameproof resin composition, which comprises: the admixture of 3 to 30 wt. % of an adduct of 2,4,6-triamino-1,3,5-triazine and 2,4,6-trihydroxy-1,3,5-triazine and/or a tautomer thereof with a linear polyester.

2. The flameproof resin composition according to claim 1 wherein a polyester is polybutyleneterephthalate.

3. The flameproof resin composition according to claim 1 wherein the adduct is an equimolar-amount of 2,4,6-triamino-1,3,5-triazine and 2,4,6-trihydroxy-1,3,5-triazine.

4. The composition of claim 1, wherein the polyester is polyethylene terephthalate.

5. The composition of claim 1, wherein the amount of said adduct ranges from 5 to 20 wt. % in said composition.

6. The composition of claim 1, which further comprises an antimony oxide or a halogen containing compound as a flame proofing agent.

7. The composition of claim 1, which further comprises: a carbon, asbestos, or glass fibrous filler.

* * * * *